Feb. 8, 1966  L. J. O'BRIEN  3,233,477
DIFFERENTIAL TRANSMISSION INCLUDING A CLUTCH
Filed May 24, 1962

United States Patent Office 3,233,477
Patented Feb. 8, 1966

3,233,477
DIFFERENTIAL TRANSMISSION INCLUDING A CLUTCH
Loren J. O'Brien, Grabill, Ind., assignor to Dana Corporation, Toledo, Ohio, a corporation of Virginia
Filed May 24, 1962, Ser. No. 197,344
5 Claims. (Cl. 74—710.5)

This invention relates to differential transmission clutches in general and more specifically to a novel structure of a differential housing and of the interleaved disk type clutch disposed therein so that relative rotation between certain members of the clutch and the housing is prevented and wear therebetween is maintained at a minimum.

The prior art discloses many differential transmissions having interleaved clutch disks disposed between members of a gear train and the differential housing and adapted to be pressed by a member of the gear train or by some other means into engagement with each other and/or the differential housing thereby retarding relative rotation between members of the gear train and inhibiting differentiation. In the usual clutch, some of the interleaved disks are mounted for rotation with a member of the gear train while the balance of the disks are mounted for rotation with the differential housing.

Normally the disks mounted for rotation with the differential housing are of substantially annular configuration and include a plurality of driving keys extending radially from the circumference thereof. The portion of the differential housing receiving these disks is normally cylindrical and is provided with keyways or slots to receive the radially extending keys of the cooperable clutch disks. The interleaved disks which are disposed adjacent the inner ends of the housing are adapted to be pressed into engagement therewith and frictionally engage the same.

The above described differential housing and clutch disks have many detrimental characteristics, including but not limited to; the grooved housing is difficult to prepare for it cannot be accurately cast in its finished shape but must be cast with a substantially cylindrical bore and then the grooves machined therein; the keys on the clutch disks and the annular nature of the disks result in a substantial waste of material during the forming thereof and additionally, the keys are very susceptible to being broken off the disks; the surfaces of the differential housing which are frictionally engaged by the clutch disks and which are subjected to engagement by the keys of the clutch disks are subjected to severe wear from these engagements and therefore must be made from relatively expensive material having a substantial hardness to resist such wear.

It is therefore an object of this invention to provide a differential housing having an interleaved disk friction clutch wherein the structure thereof is such that the manufacturing cost is reduced to a minimum and satisfactory wear can be obtained with relatively inexpensive materials of a lower hardness level.

It is another object of this invention to provide an interleaved disk clutch for a differential transmission wherein the configuration of certain of the disks is such as to result in a substantial savings of material.

It is a further object of this invention to provide a differential housing including a disk clutch wherein some of the disks are adapted for unitary rotation with said housing and wherein the connection between said disks and said housing is such as to result in a minimum of breakage of said disks and wear of the housing.

It is yet another object of this invention to provide a differential housing including a clutch having disks adapted for rotation therewith which housing may be cast to final dimensions and requires no additional machining to accommodate said clutch.

It is a still further object of this invention to provide such a housing and disk clutch which is inexpensive, easy to manufacture, and yet durable and capable of extended service.

These and other objects will become apparent upon a consideration of the following specification when taken in consideration with the drawings wherein.

Figure 1:
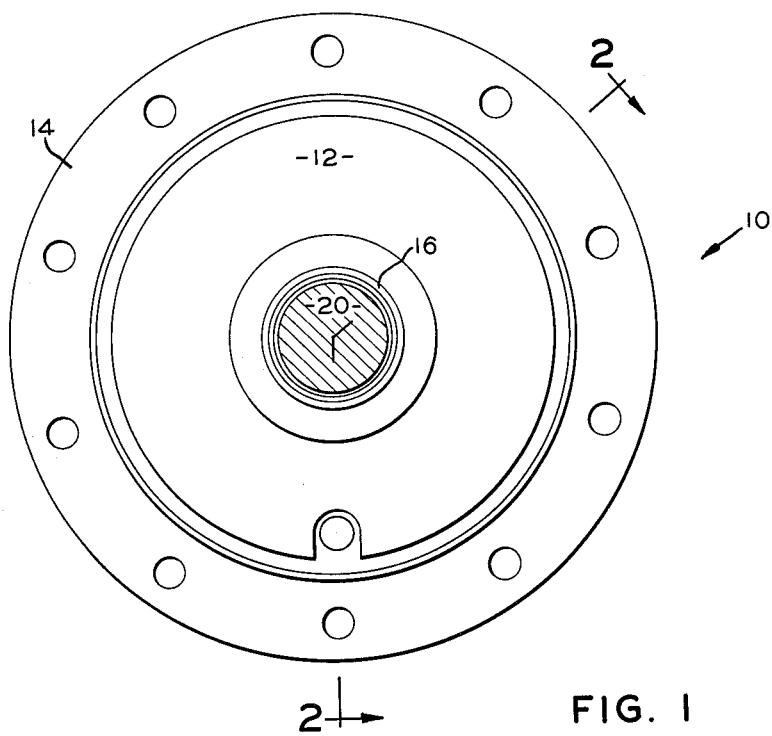
FIG. 1 is an end elevational view of a differential transmission embodying this invention.
Figure 2:
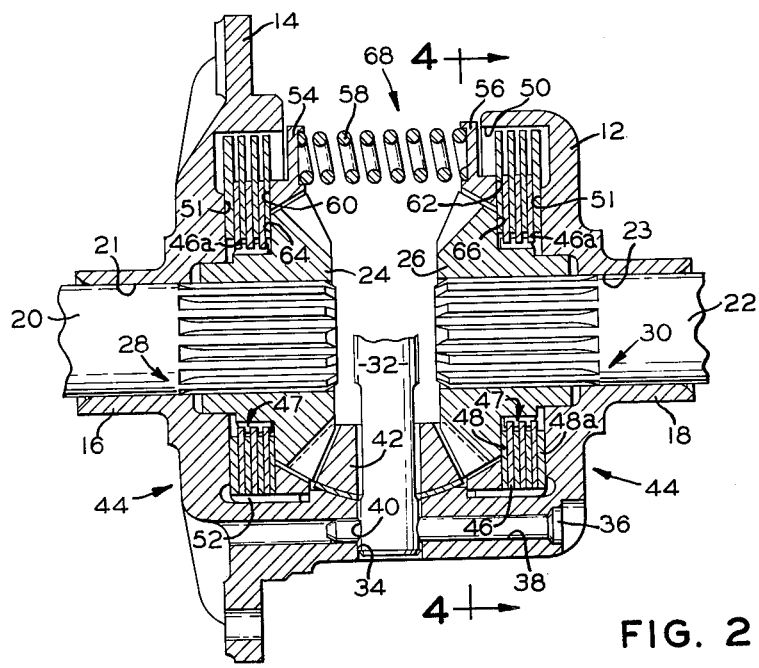
FIG. 2 is a view taken along the lines 2—2 of FIG. 1.

Referring now to the drawings, the differential transmission shown generally at 10 includes a one piece housing 12 which is substantially cylindrical in configuration and includes an annular flange 14 suitably adapted for the attachment of the usual ring gear (not shown). The end faces of the housing 12 are provided externally with annular flanges 16 and 18. The flanges are adapted to receive the usual axle shafts 20 and 22 which project into the housing 12 through the openings 21 and 23 therein. The inner ends of the axle shafts 20 and 22 mount side gears 24 and 26 respectively for rotation therewith and axial movement relative thereto by means of the spline connections shown generally at 28 and 30. A plurality of cross pins one of which is shown at 32 are disposed in radially extending openings 34 in the differential housing 12. The cross pins 32 are fixedly secured relative to the housing 12 by means of a locked pin 36 extending through registering openings 38 and 40 in the housing and cross pin respectively.

Each cross pin rotatably mounts a pinion mate, one of which is shown at 42, which pinion mates are in mesh with the side gears 24 and 26. The side gears 24 and 26 and the pinions 42 serve as a differential gear train for the differential 10 in a well known manner.

Figure 3:
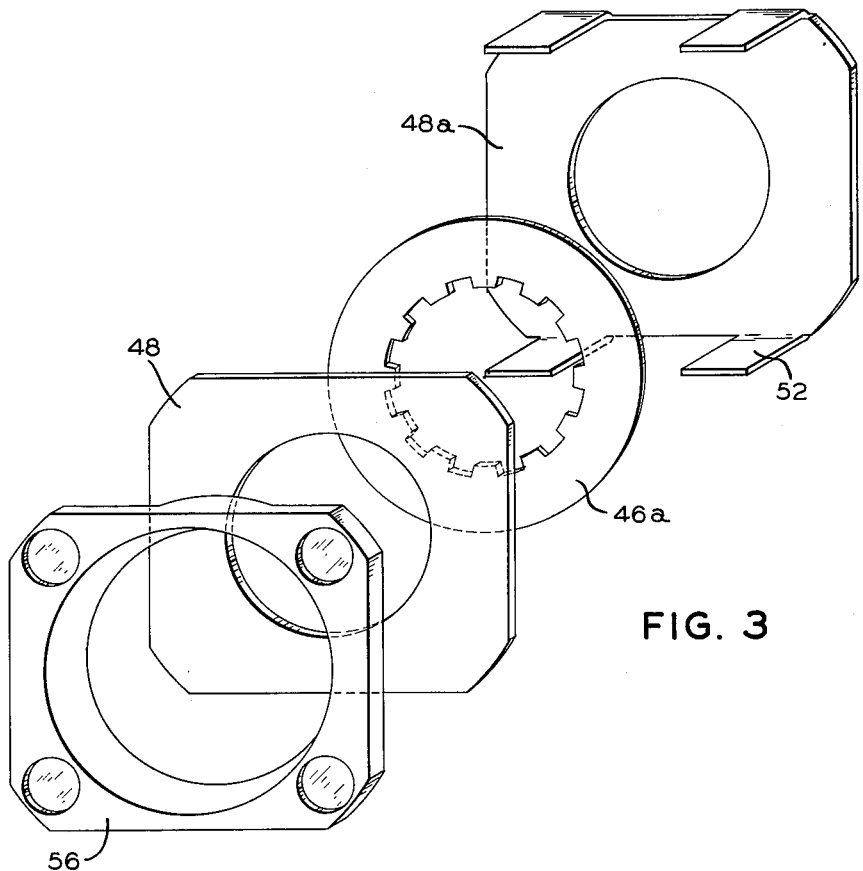
FIG. 3 is an exploded isometric view of the clutch shown in FIG. 1 with several of the disks omitted for added clarity.
Figure 4:
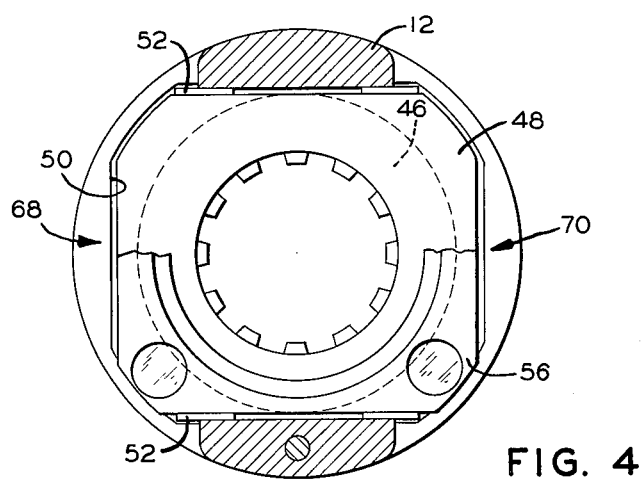
FIG. 4 is a view of the differential taken along the lines 4—4 of FIG. 2 with some of the parts broken away for added clarity.

Clutch means shown generally at 44 are provided to limit the differential movement of the gear train of the differential 10. More particularly a plurality of annular clutch disks 46 are mounted about the hubs of the side gears 24 and 26 and adapted for unitary rotation therewith and axial movement relative thereto by means of a spline engagement therebetween shown generally at 47. A plurality of clutch disks 48 of substantially polygonal configuration in cross section are mounted in the housing 12 for rotation therewith and axial movement relative thereto. More particularly, as best seen in FIGS. 3 and 4, the housing 12 is formed with a pair of substantially rectangular bores 50 formed adjacent the ends thereof which bores receive the substantially rectangular clutch disks 48 in a closely fitting relationship. The most outwardly clutch disk 48A is provided with a plurality of lugs 52 which are formed integrally therewith and extend axially inwardly therefrom in a surrounding relationship with the other of the clutch disks 48. The bores 50 terminate at their outer ends at the inner walls 51 of the housing 12.

The disks 48A including the lugs 52 thereon are preferably formed from a hardenable material and hardened sufficiently so that it may serve as a wear plate in absorbing frictional forces which result from the adjacent clutch disk 46A being pressed into engagement therewith and further the lugs 52 serve to resist the wear which occurs when the clutch disks 46 and 48 are compressed to resist relative rotary movement between the side gears 24 and 26 and the differential housing 12. Under these conditions, the disks 46 impose rotational forces to the disks 48 which forces are absorbed by the case 12 with the lugs 52 therebetween serving as wear plates by engaging the periphery of the disks 48 and the bore 50.

Because of the polygonal configuration of the bore 50 and the cooperating polygonal configuration of the disks 48 and 48A, relative rotation between these structures cannot occur. It is therefore apparent that the housing 12 may be made of relatively inexpensive material with no special hardening such as grey iron or ferritic malleable instead of the more expensive specially heat-treated materials such as pearlitic malleable and the like and still not be subjected to undesirable wear.

It should be noted that other configurations lacking in radially extending keys besides the polygonal rectangular configurations shown and described above can be utilized for the bore 50 and the disks 48 and 48A as long as the structure utilized is such that by the very nature of the configuration of the periphery of the disks and of the bore relative rotation cannot take place therebetween. Such a configuration can be better defined as one which when viewed in cross section is a circular or one in which the adjacent center to perimeter distances constantly vary. Since the bore 50 need not be provided with axially extending slots or keyways, it is readily apparent that it may be cast to its finished shape with relatively little difficulty and expense.

Means are provided to initially urge the clutch disks 46, 48 and 48A into an interengaging relationship and against the wall 51 of the case 12. More particularly a pair of pressure plates 54 and 56 are disposed in spaced relationship about the side gears 24 and 26 respectively. A plurality of coil springs 58 are interposed between the pressure plates 54 and 56 and bias the same apart. The outer surfaces 60 and 62 of the pressure plates 54 and 56 respectively abuttingly engage the innermost disk 48 thereby urging the disks 46 and 48 into initial engagement. Means are provided to augment the above initial biasing force on the clutch disks 46 and 48. More particularly the side gears 24 and 26 and pinion mates 42 are provided with positive pressure angle teeth which, in response to torque being transmitted thereby, urge the side gears axially outwardly. The back faces 64 and 66 of the side gears 24 and 26 respectively engage the innermost disk 48 thereby urging the disks 46 and 48 into engagement.

The case 12 is provided with a pair of radially opposed openings shown generally at 68 and 70, through which openings the members of the clutch, gear train, the pressure plates and spring means are inserted for assembling the differential.

It should be noted that the means for applying the force necessary to compress the disks 46, 48 and 48A of the clutch into engagement does not form a part of this invention, any suitable compressing means may be utilized. It is the particular configuration of the structure of the differential housing and clutch disks and their relationship to which this invention is directed.

The preferred embodiment of this invention has been shown and described, but changes and modifications can be made and it is understood that this description is illustrative only and not for the purpose of rendering this invention limited to the details illustrated or described except insofar as they have been limited by the terms of the following claims.

What is claimed is:

1. A differential transmission including a clutch comprising in combination,
    (a) a housing having an axially extending bore therein with the axially extending inner surface of said housing surrounding said bore defining a first wall of said bore and said housing having a portion extending transversely to said bore and terminating the latter with the inner surface of said transverse portion defining a second wall of said bore,
    (b) a differential gear train operatively disposed in said housing,
    (c) clutch means operative to inhibit differential movement of said gear train members and including a plurality of interleaved elements disposed in the bore of said housing,
    (d) some of said interleaved elements being unitarily rotatable with and axially movable relative to at least one of said gear train members and surrounding at least a portion thereof,
    (e) one of the other interleaved elements and said first wall having cooperating configurations whereby said one element is mounted for unitary rotation with and axially movable relative to said housing,
    (f) said one of said other elements having at least a portion thereof interposed between the remainder of said other elements and first and second walls of said housing whereby the same serve as wear plates between the outer portions of said clutch means and said housing.

2. A differential transmission including a clutch comprising in combination,
    (a) a housing having an axially extending bore therein with the axially extending inner surface of said housing surrounding said bore defining a first wall of said bore and said housing having a portion extending transversely to said bore and terminating the latter with the inner surface of said transverse portion defining a second wall of said bore,
    (b) differential gear train members operatively disposed in said housing,
    (c) a clutch means carried by said housing and at least one of said gear train members with at least a portion thereof disposed in said bore and operative to inhibit differential movement of said gear train members,
    (d) said clutch means including a plurality of interleaved elements,
    (e) some of said interleaved elements being unitarily rotatable with and axially movable relative to at least one of said gear train members and surrounding at least a portion thereof,
    (f) the other of said elements being unitarily rotatable with and axially movable relative to said housing with one of said other elements having a plurality of lug means formed integrally therewith and extending axially therefrom and interposed between the periphery of the remaining elements of said plurality of elements and said first wall,
    (g) said one of said other elements being interposed between the remainder of said plurality of elements and said second wall of said housing and adapted to engage the later,
    (h) said lug means and said engaging element being hardened whereby the same serve as wear plates between the outer portions of said clutch means and said housing.

3. A differential transmission including a clutch comprising in combination,
    (a) a housing having an axially extending bore therein with the axially extending inner surface of said housing surrounding said bore defining a first wall of said bore and said housing having a portion extending transversely to said bore and terminating the latter with the inner surface of said transverse portion defining a second wall of said bore,
    (b) differential gear train members operatively disposed in said housing,
    (c) a clutch means operative to inhibit differential movement of said gear train members and including a plurality of interleaved friction elements,
    (d) some of said interleaved elements being unitarily rotatable with and axially movable relative to at least one of said gear train members and surrounding a portion thereof,
    (e) the other of said elements being disposed in the bore of said housing,
    (f) said other elements and said first wall having cooperating configurations which when viewed in cross section have adjacent center to perimeter distances which constantly vary whereby said other elements are mounted for unitary rotation with and axial movement relative to said housing, (g) one of said other elements having a plurality of lug means formed integrally therewith and extending axially therefrom and interposed between the periphary of said plurality of elements and said first wall, (h) and said one of said other elements being interposed between the remainder of said plurality of elements and said second wall of said housing and adapted to engage the same, (i) said lug means and said engaging elements being hardened whereby the same serve as wear plates between said clutch means and said housing.

4. A differential transmission including a clutch comprising in combination, (a) a housing having an axially extending bore therein with the axially extending inner surface of said housing surrounding said bore defining a first wall of said bore and said housing having a portion extending transversely to said bore and terminating the latter with the inner surface of said transverse portion defining a second wall of said bore, (b) a differential gear train operatively disposed in said housing and including a plurality of side gears and pinion mates, (c) a clutch means operative to inhibit differential movement of said gear train members and including a plurality of interleaved elements disposed in the bore of said housing, (d) some of said interleaved elements being unitarily rotatable with and axially movable relative to at least one of said side gears and surrounding at least a portion thereof, (e) the other elements and said first wall having cooperating configurations which when viewed in cross section are substantially rectangular whereby said other elements are mounted for unitary rotation with and axial movement relative to said housing, (f) one of said other elements being interposed between the remainder of said plurality of elements and the second wall of said housing and adapted to engage the same, (g) and a plurality of lug means formed integrally with said engaging element and extending axially therefrom between the periphery of said plurality of elements and said first wall, (h) said lug means and said engaging element being hardened whereby the same serve as wear plates between the outer portions of said clutch means and said housing, (i) and means for urging said one side gear axially outwardly toward said second wall and into a pressing relationship with said clutch means.

5. A differential transmission including a clutch comprising in combination, (a) a differential housing having an axially extending bore therein with the axially extending inner surface of said housing surrounding said bore defining a first wall of said bore, (b) said housing including a portion extending transversely relative to said bore and terminating the latter with the inner surface of said transverse portion defining a second wall of said bore, (c) said transverse portion having an axially extending opening therein, (d) a differential gear train operatively disposed in said housing and including a plurality of side gears and pinion mates, (e) an axle shaft extending through said axially extending opening and rotatable relative to said housing and mounting one of said side gears on the inner end thereof for unitary rotation, (f) at least a portion of said one side gear being disposed within said bore, (g) clutch means operative to inhibit differential movement of said gear train members and including a plurality of interleaved elements disposed in the bore of said housing, (h) some of said interleaved elements being mounted on the portion of said side gear disposed within said bore for unitary rotation therewith and axial movement relative thereto and being rotatable relative to said housing, (i) said other elements and said first wall having cooperating configurations which when viewed in cross-section have adjacent center to perimeter distances which constantly vary whereby said other elements are mounted for unitary rotation with an axial movement relative to said housing, (j) one of said other elements being interposed between the remainder of said plurality of elements and the second wall of said housing and adapted to engage the same, and (k) a plurality of lug means formed integrally with said engaging element and extending axially therefrom between the periphery of said plurality of elements and said first wall of said housing, (l) said lug means and said engaging element being hardened whereby the same serve as wear plates between the outer portions of said clutch means and said housing, (m) and means for urging said one side gear axially outwardly toward said second wall and into a pressing relationship with said clutch means.

References Cited by the Examiner
UNITED STATES PATENTS

| | | | |
|---|---|---|---|
| 1,660,497 | 2/1928 | Treiber | 192—69 |
| 1,683,806 | 9/1928 | Richards | 192—69 |
| 2,354,214 | 7/1944 | Lockwood | 74—711 |
| 2,966,076 | 12/1960 | O'Brien | 74—710.5 |
| 3,052,137 | 9/1962 | Russell | 74—710.5 |

DON A. WAITE, *Primary Examiner.*